US012565253B2

(12) United States Patent
Kuang

(10) Patent No.: US 12,565,253 B2
(45) Date of Patent: Mar. 3, 2026

(54) EASY-TO-FOLD STROLLER

(71) Applicant: Junhao Kuang, Linwu County (CN)

(72) Inventor: Junhao Kuang, Linwu County (CN)

(73) Assignee: Zhongshan Congbao Baby Products Co., Ltd., Zhongshan (CN)

( * ) Notice: Subject to any disclaimer, the term of this patent is extended or adjusted under 35 U.S.C. 154(b) by 0 days.

(21) Appl. No.: 19/378,371

(22) Filed: Nov. 4, 2025

(65) Prior Publication Data

US 2026/0054762 A1 Feb. 26, 2026

(30) Foreign Application Priority Data

Sep. 29, 2025 (CN) .......................... 202522108453.2

(51) Int. Cl.
B62B 7/08 (2006.01)
(52) U.S. Cl.
CPC ...................................... B62B 7/08 (2013.01)
(58) Field of Classification Search
CPC .... B62B 7/08; B62B 7/06; B62B 3/02; B62B 3/022; B62B 3/025; B62B 3/027
See application file for complete search history.

(56) References Cited

U.S. PATENT DOCUMENTS

| | | | | |
|---|---|---|---|---|
| 9,327,749 B2 * | 5/2016 | Young | ...................... | B62B 5/08 |
| 11,981,364 B2 * | 5/2024 | Ma | ........................ | B62B 5/0461 |
| 12,304,547 B2 * | 5/2025 | Kuang | ................... | B62B 7/062 |
| 12,351,225 B2 * | 7/2025 | Lei | ........................... | B62B 7/08 |
| 12,479,491 B1 * | 11/2025 | Li | ........................... | B62B 7/08 |

* cited by examiner

*Primary Examiner* — John D Walters

(57) ABSTRACT

Disclosed is an easy-to-fold stroller having a folded state and an unfolded state. The stroller includes a front frame assembly, a rear frame assembly and two side frame assemblies. Each side frame assembly includes a front top rod, a front bottom rod, a rear top rod, a rear bottom rod and a locking assembly. The locking assembly consists of a locking housing, a driving member, two first reset members and two locking members. The driving member is connected to the locking housing and slidable between a first position and a second position. The locking members are connected to the locking housing and slidable between a locking position and a releasing position to lock or release the front top rod and the rear top rod. The first reset members are disposed inside the locking housing and enable the locking members to have a tendency to move toward the locking positions.

20 Claims, 17 Drawing Sheets

EASY-TO-FOLD STROLLER

CROSS-REFERENCE TO RELATED APPLICATIONS

The present application claims the benefit, under 35 USC § 119(e), of Chinese Patent Application No. 202522108453.2, filed on Sep. 29, 2025 in the China National Intellectual Property Administration (CNIPA). The disclosure of the aforementioned application is incorporated in the present application by reference in its entirety.

TECHNICAL FIELD

The present application relates to the field of strollers, and in particular to an easy-to-fold stroller.

BACKGROUND OF THE INVENTION

People often use strollers for outdoor leisure activities, especially when taking infants or young children on outdoor outings. These strollers not only allow an infant or a young child to sit or lie inside, making it convenient to take the infant or young child around during outings, but also can hold some outdoor supplies, thus serving as a labor-saving and easy-to-use carrying tool.

Currently, among the strollers available on the market, foldable strollers are highly favored by consumers due to their features such as foldability, easy portability and convenient storage. However, the folding operations of the existing foldable strollers are rather troublesome. For some models, users need to press or pinch an unlocking button with one hand, while simultaneously rotating components such as the front support frame, rear support frame and side support frames with the other hand to fold the stroller. For other models, the users first need to release a locking mechanism, then press the front support frame from the front, and the rear support frame from the rear to complete the folding process. These folding and locking structures not only make the stroller folding time-consuming and labor-intensive, but also create a risk of pinching the users' fingers when the frames rotate toward each other, which results in a poor user experience.

For this reason, the present application provides an easy-to-fold stroller, which can effectively solve the above problems. The easy-to-fold stroller has a simple structure. The users can grasp and squeeze a locking assembly with one hand to complete the unlocking, and then lift the locking assembly upward to fold the stroller.

SUMMARY OF THE INVENTION

To overcome the problems of the related art, the present application provides an easy-to-fold stroller. The users can grasp and squeeze a locking assembly with one hand to complete the unlocking, and then lift a locking assembly upward to fold the stroller.

The solution of the present application is as follow:

an easy-to-fold stroller having a folded state and an unfolded state, including:

a front frame assembly;

a rear frame assembly; and two side frame assemblies arranged between the front frame assembly and the rear frame assembly for unfolding and folding, wherein each side frame assembly includes:

a front top rod including a front end and a rear end, the front end of the front top rod being hinged to an upper side of the front frame assembly;

a front bottom rod including a front end and a rear end, the front end of the front bottom rod being hinged to a lower side of the front frame assembly;

a rear top rod including a front end and a rear end, the rear end of the rear top rod being hinged to an upper side of the rear frame assembly;

a rear bottom rod including a front end and a rear end, the rear end of the rear bottom rod being hinged to a lower side of the rear frame assembly and the front end of the rear bottom rod being hinged to the rear end of the front bottom rod; and a locking assembly including two ends hinged to the rear end of the front top rod and the front end of the rear top rod respectively, and the locking assembly further including:

a locking housing;

a driving member connected to the locking housing and slidable between a first position and a second position;

two first reset members disposed inside the locking housing; and two locking members, each locking member being connected to the locking housing and slide between a locking position and a released position to lock or release the front top rod and the rear top rod, each first reset member is configured to impart a tendency to a corresponding one of the locking members to move toward the locking position, when the driving member is moved from the first position toward the second position by an external force, each locking member is driven by the driving member to slide from the locking position toward the released position, thereby releasing the front top rod and the rear top rod of the corresponding side frame assembly.

The easy-to-fold stroller provided in the embodiments of the present application has at least one of the following advantages: through the above structure, when folding the stroller, the driving member of each locking assembly is pressed by a user and moved from the first position toward the second position. The driving member pushes the locking members to move the locking members from the locking positions toward the releasing positions. The locking assemblies release the front top rods and the rear top rods of the two side frame assemblies to allow relative rotation of connected components, and at the meantime the locking assemblies are pulled upward by the user to fold the stroller. When the stroller is in the unfolded state, axes of the front top rod and the rear top rod of each locking assembly are substantially on the same line. The first reset member of each locking assembly drives the two locking members to lock the front top rod and the rear top rod of the corresponding side frame assembly respectively, so as to prevent relative rotation of the connected components and ensure the stability of the stroller.

BRIEF DESCRIPTION OF DRAWINGS

In order to more clearly illustrate the embodiments of the present application, a brief description will be made related to the figures used in the description of embodiments. The figures in the following description are only some embodiments of the present application. It will be apparent to those skilled in the art that other figures can be obtained according to the structures shown in the figures without creative work.

The present application will be further described below with reference to the accompanying drawings and embodiments.

DETAILED DESCRIPTION OF THE INVENTION

Figure 1:
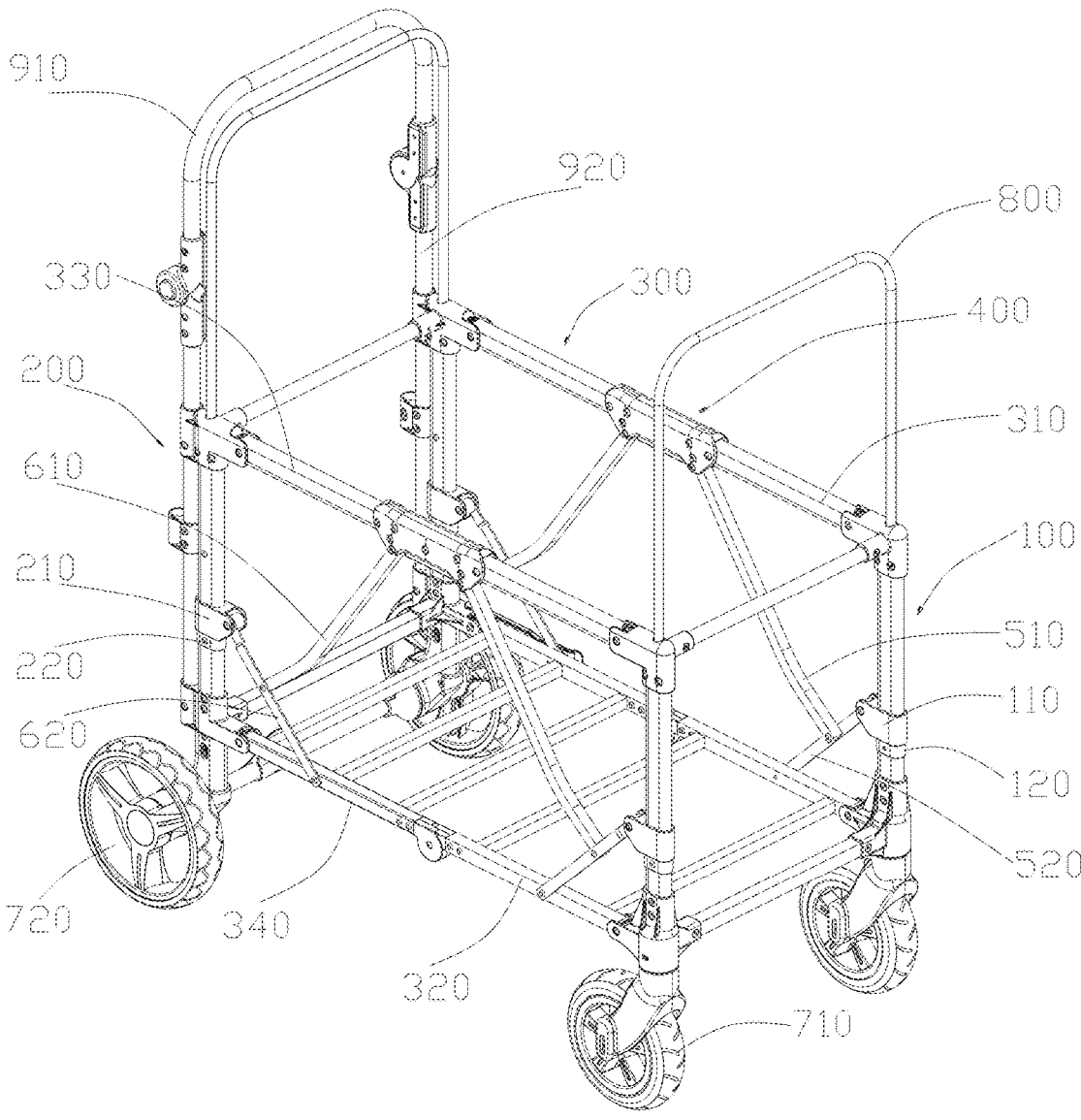
FIG. 1 is a schematic structural view of an easy-to-fold stroller in an unfolded state according to an embodiment of the present application.
Figure 2:
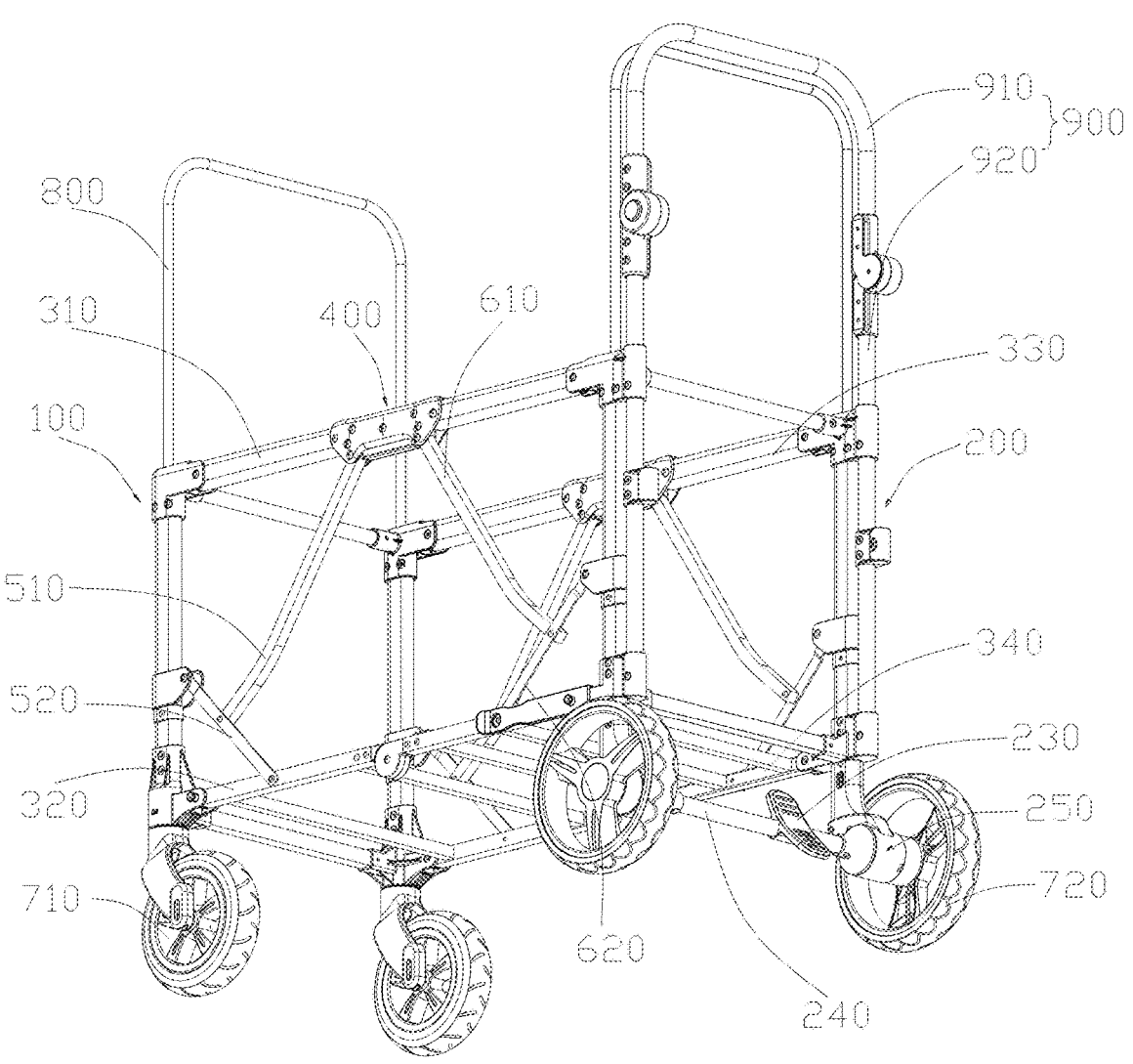
FIG. 2 is a schematic structural view of the stroller of FIG. 1, viewed from another perspective.
Figure 3:
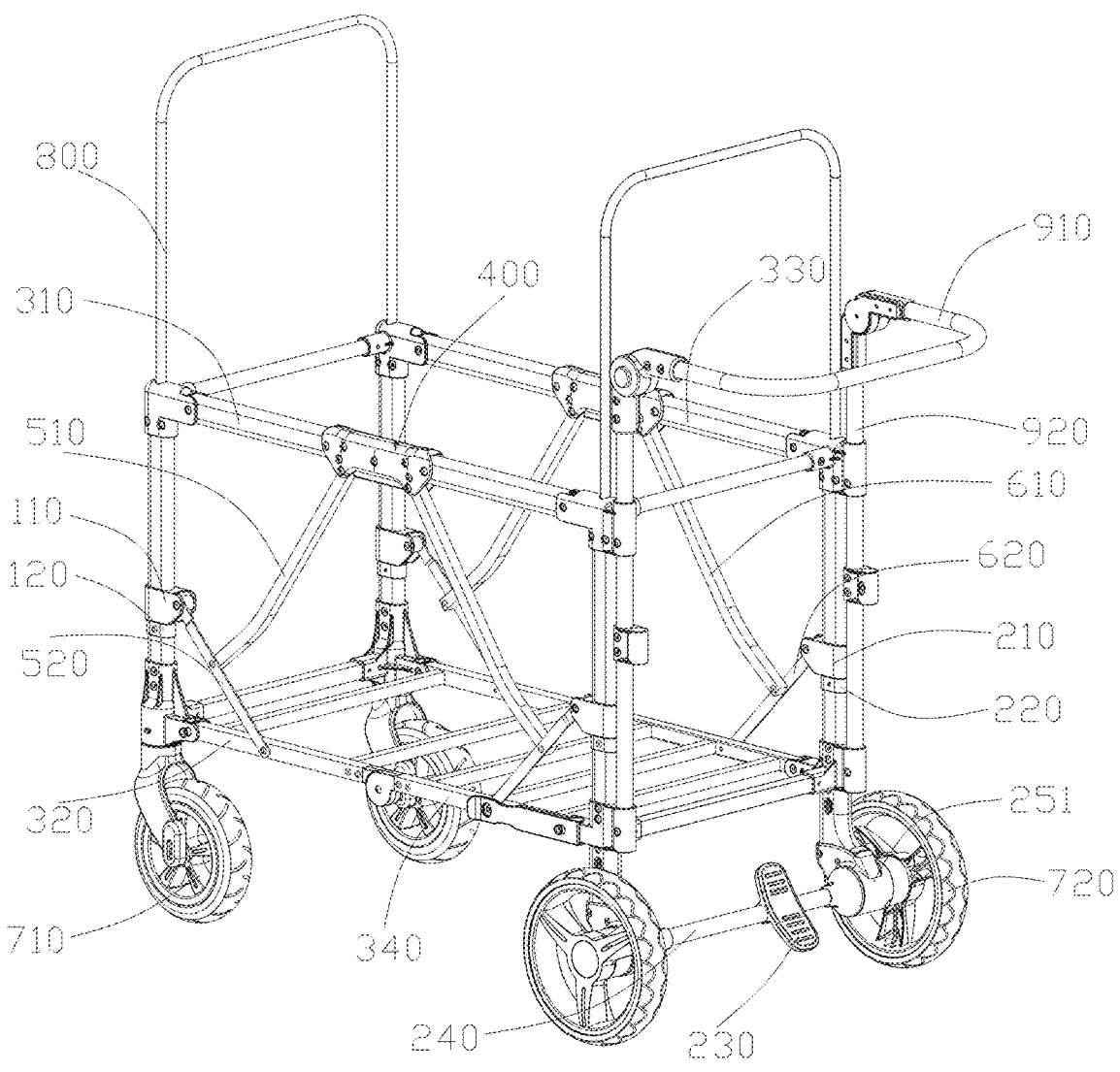
FIG. 3 is a schematic view of the overall structure of the stroller of FIG. 1, with a handle unfolded.
Figure 4:
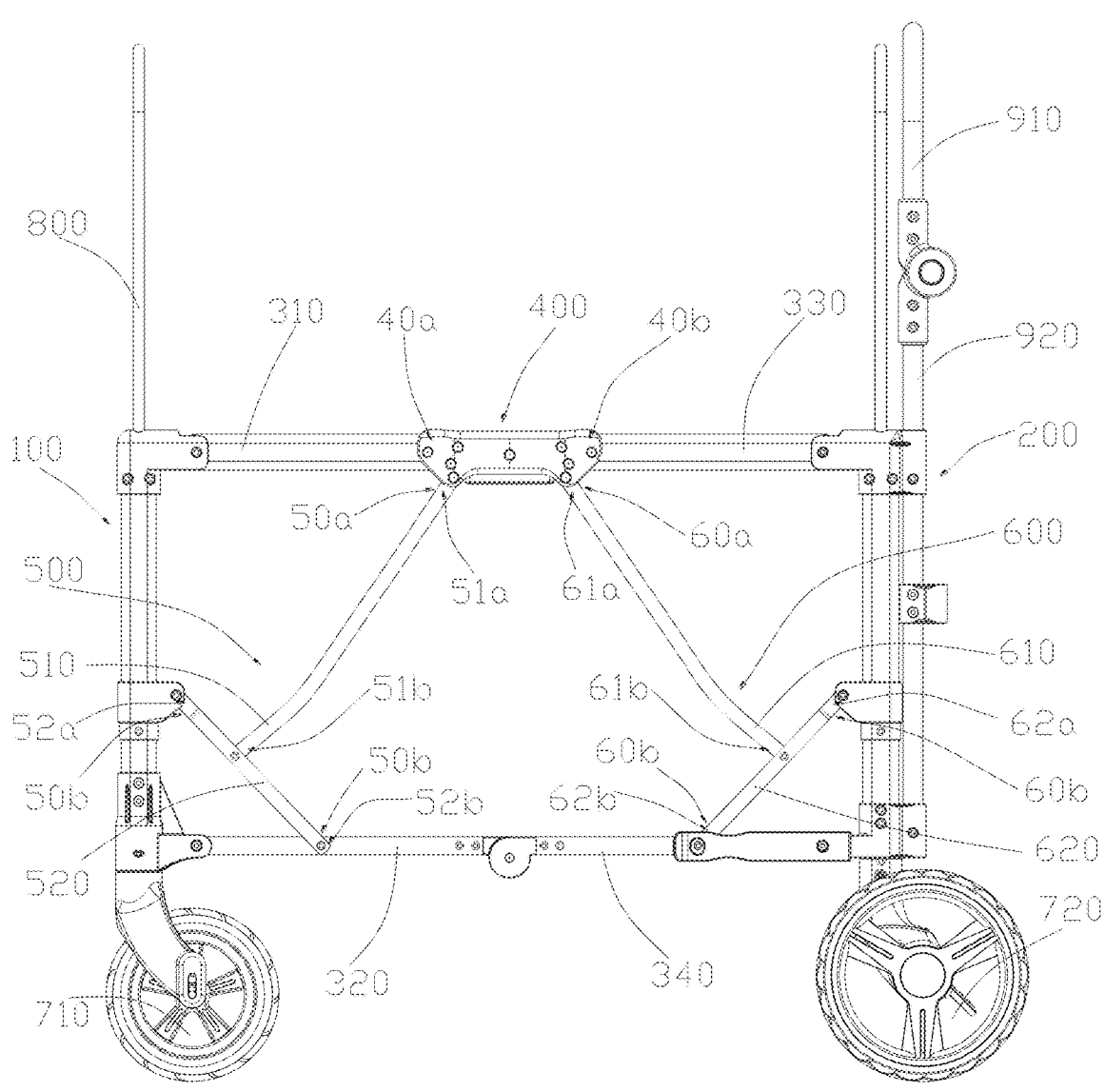
FIG. 4 is a side view of the stroller of FIG. 1.
Figure 5:
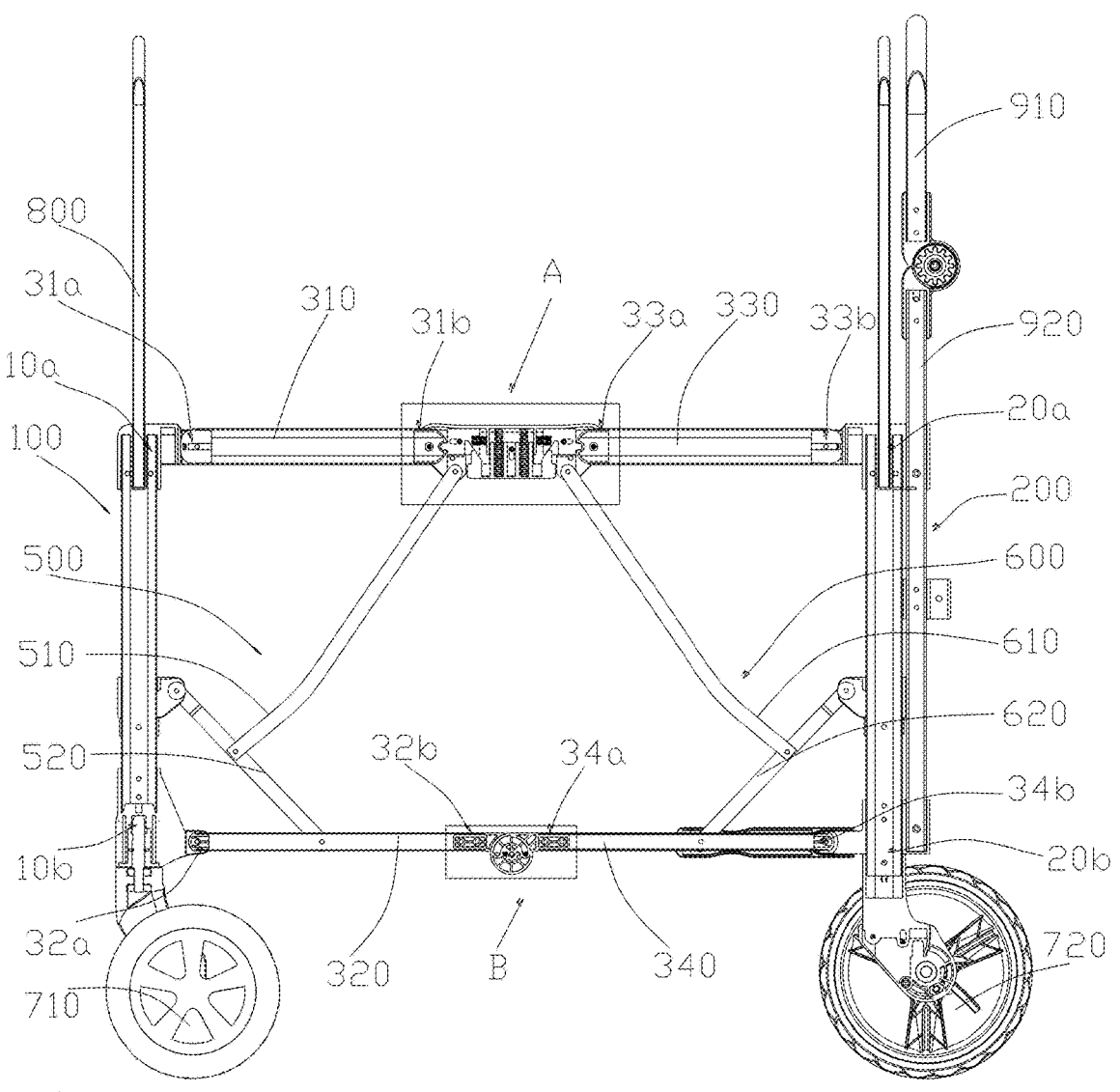
FIG. 5 is a cross-sectional view of the stroller of FIG. 1 with locking members being in the locking positions.
Figure 6:
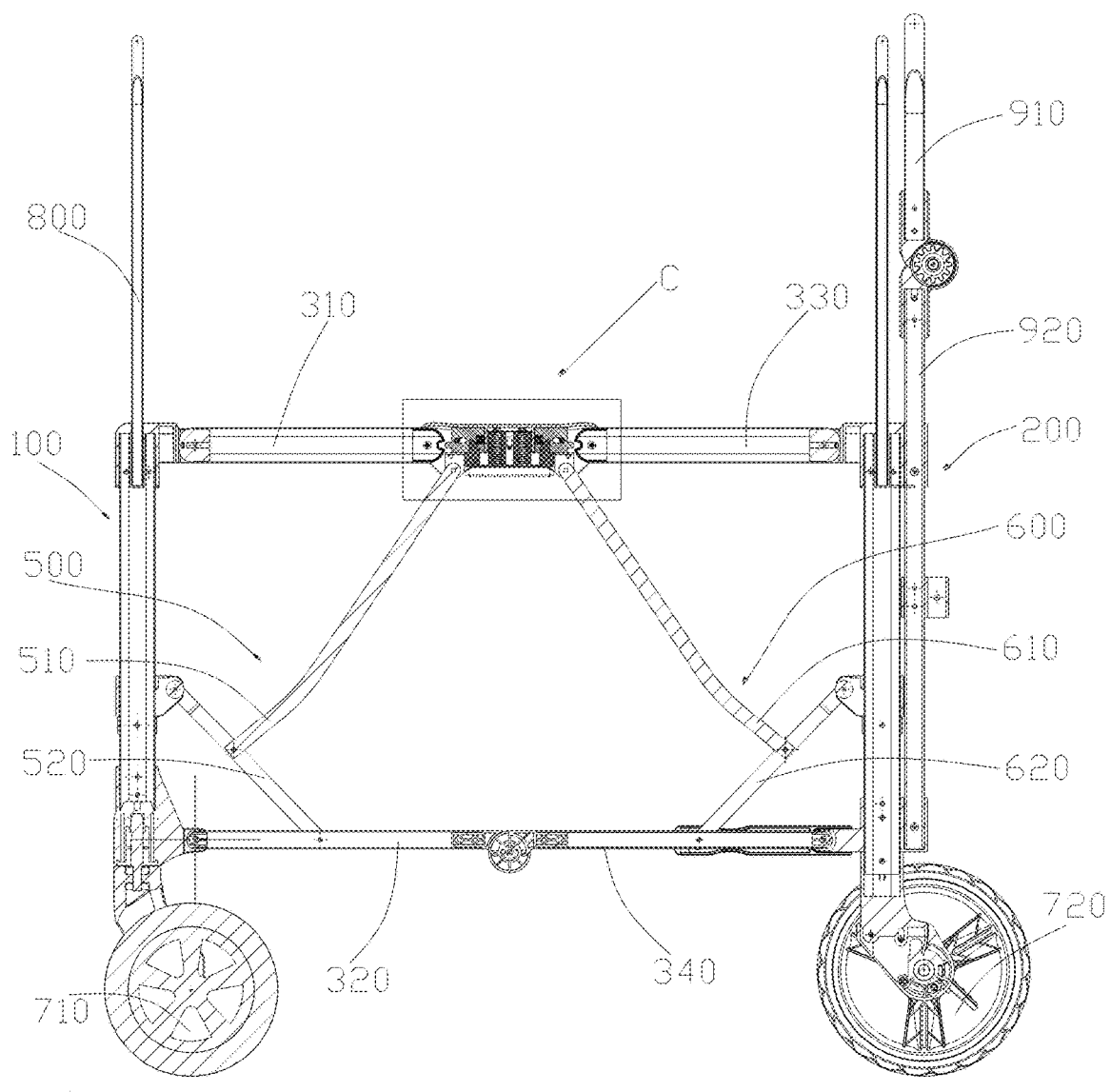
FIG. 6 is a cross-sectional view of the stroller of FIG. 1 with the locking members being in the released positions.
Figure 7:
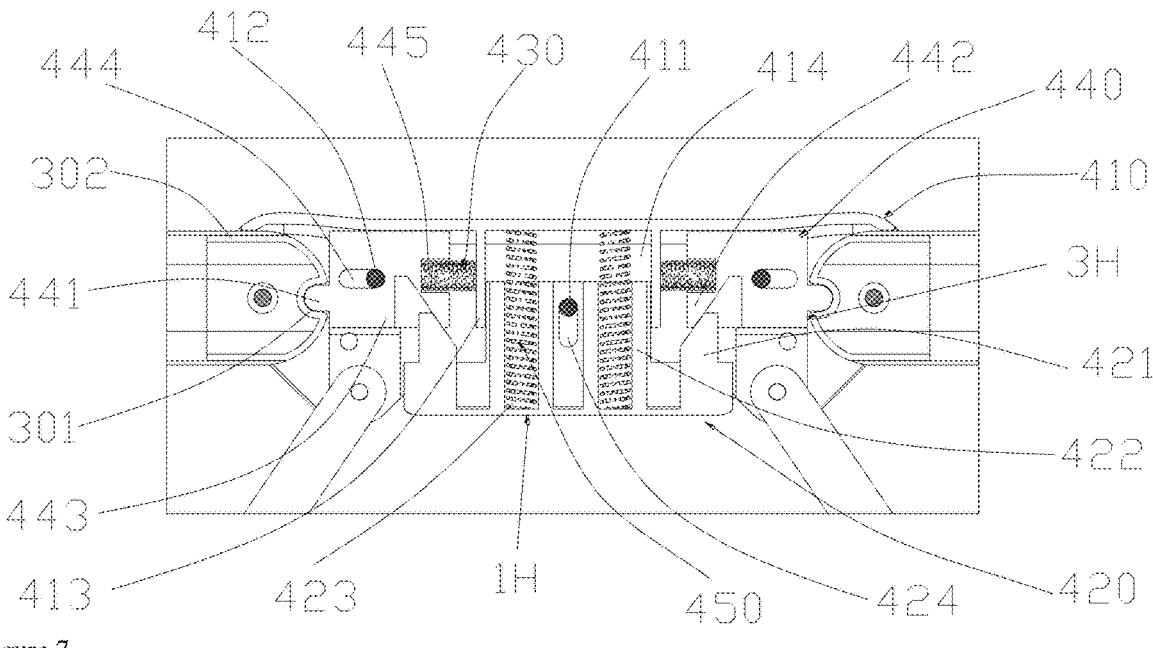
FIG. 7 is an enlarged view of the portion A of FIG. 5.
Figure 8:
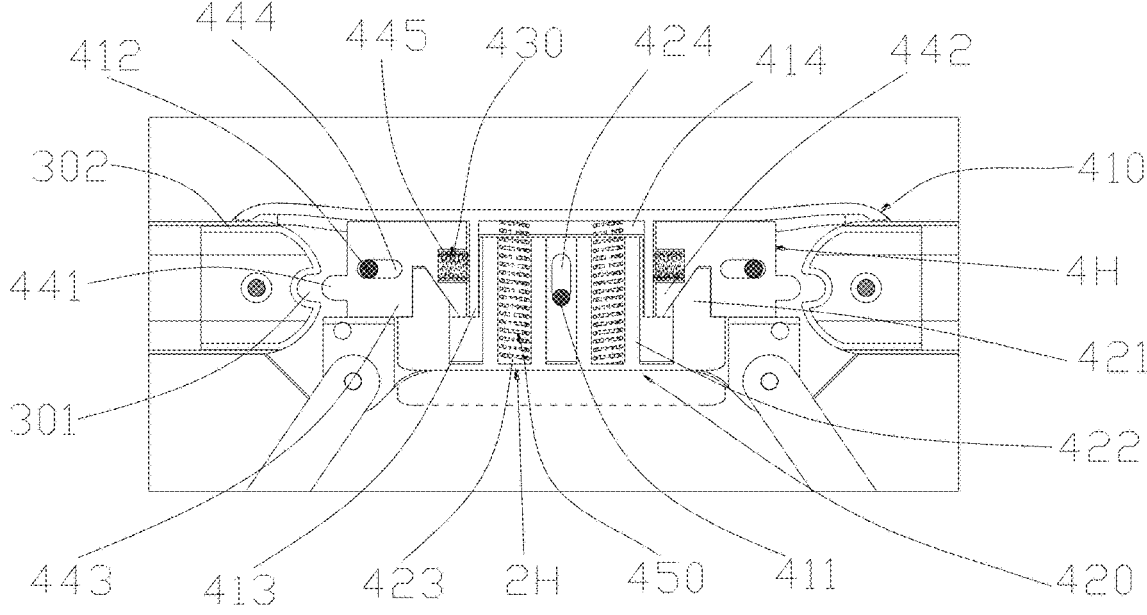
FIG. 8 is an enlarged view of the portion C of FIG. 6.
Figure 9:
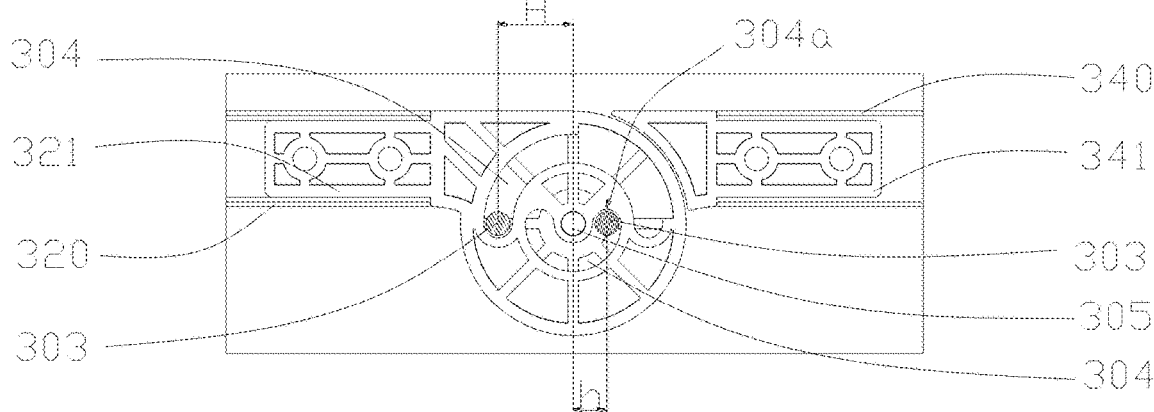
FIG. 9 is an enlarged view of the portion B of FIG. 5.
Figure 10:
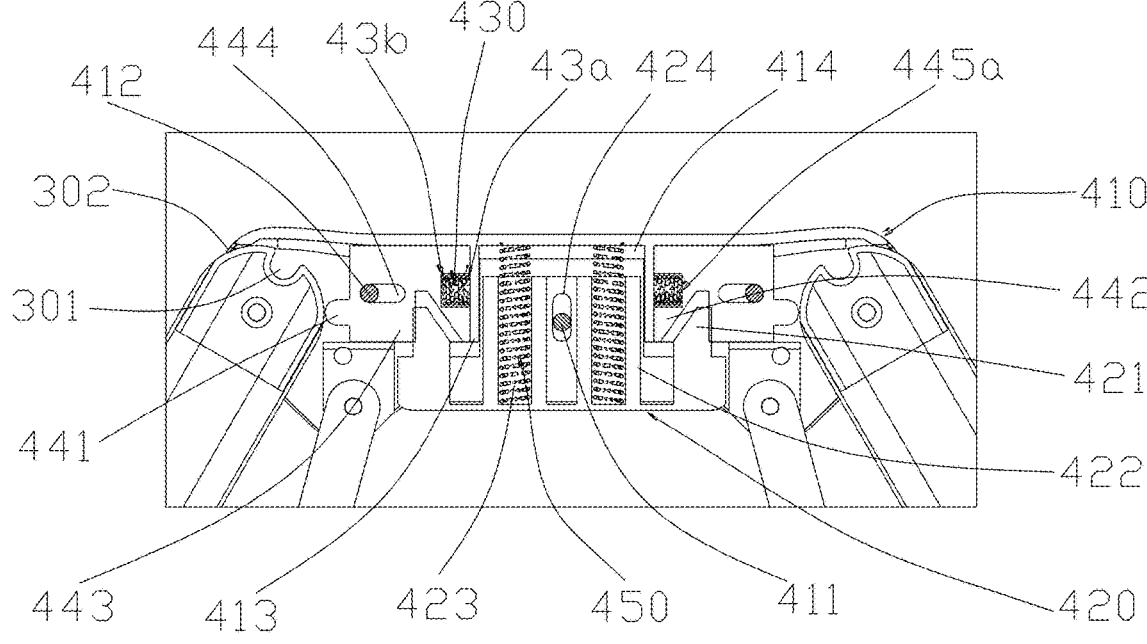
FIG. 10 is a cross-sectional view of the stroller of FIG. 1 in a semi-folded state.
Figure 11:
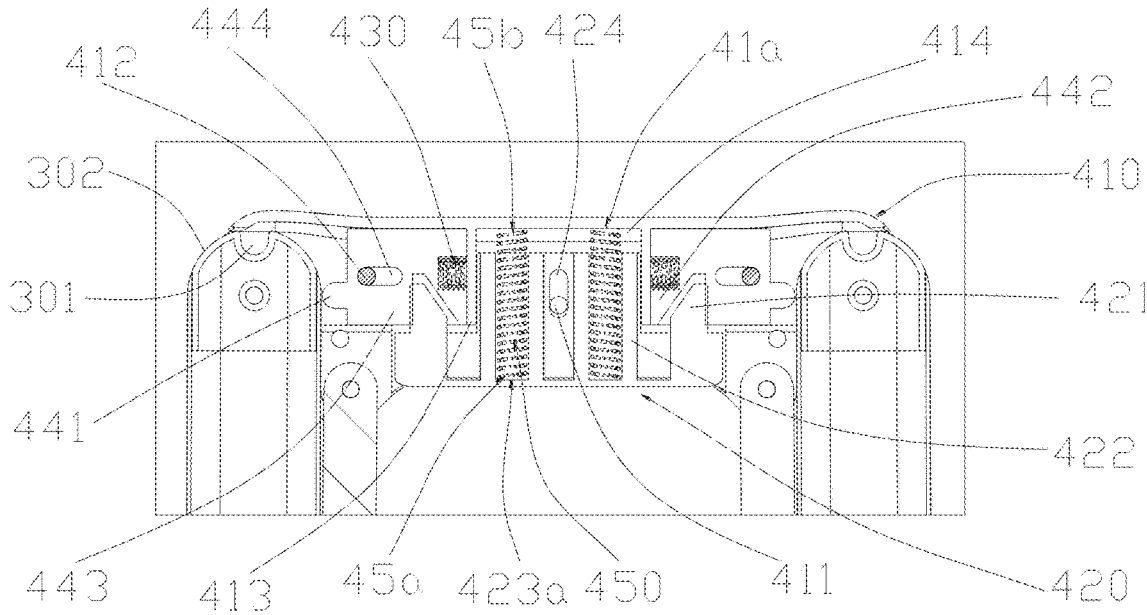
FIG. 11 is a cross-sectional view of the stroller of FIG. 1 in a folded state.
Figure 12:
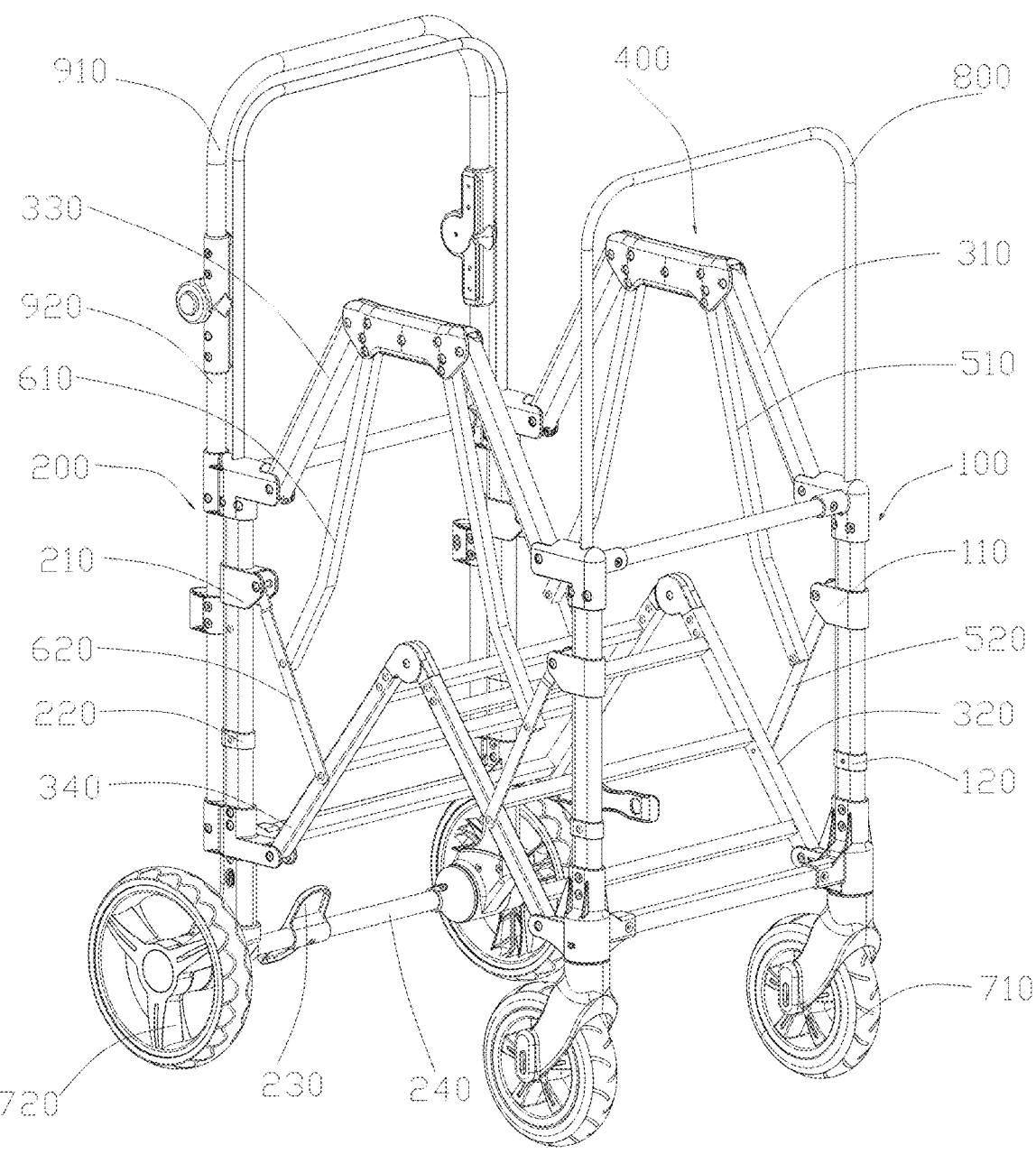
FIG. 12 is a schematic view of the overall structure of the stroller of FIG. 1 in a semi-folded state.
Figure 13:
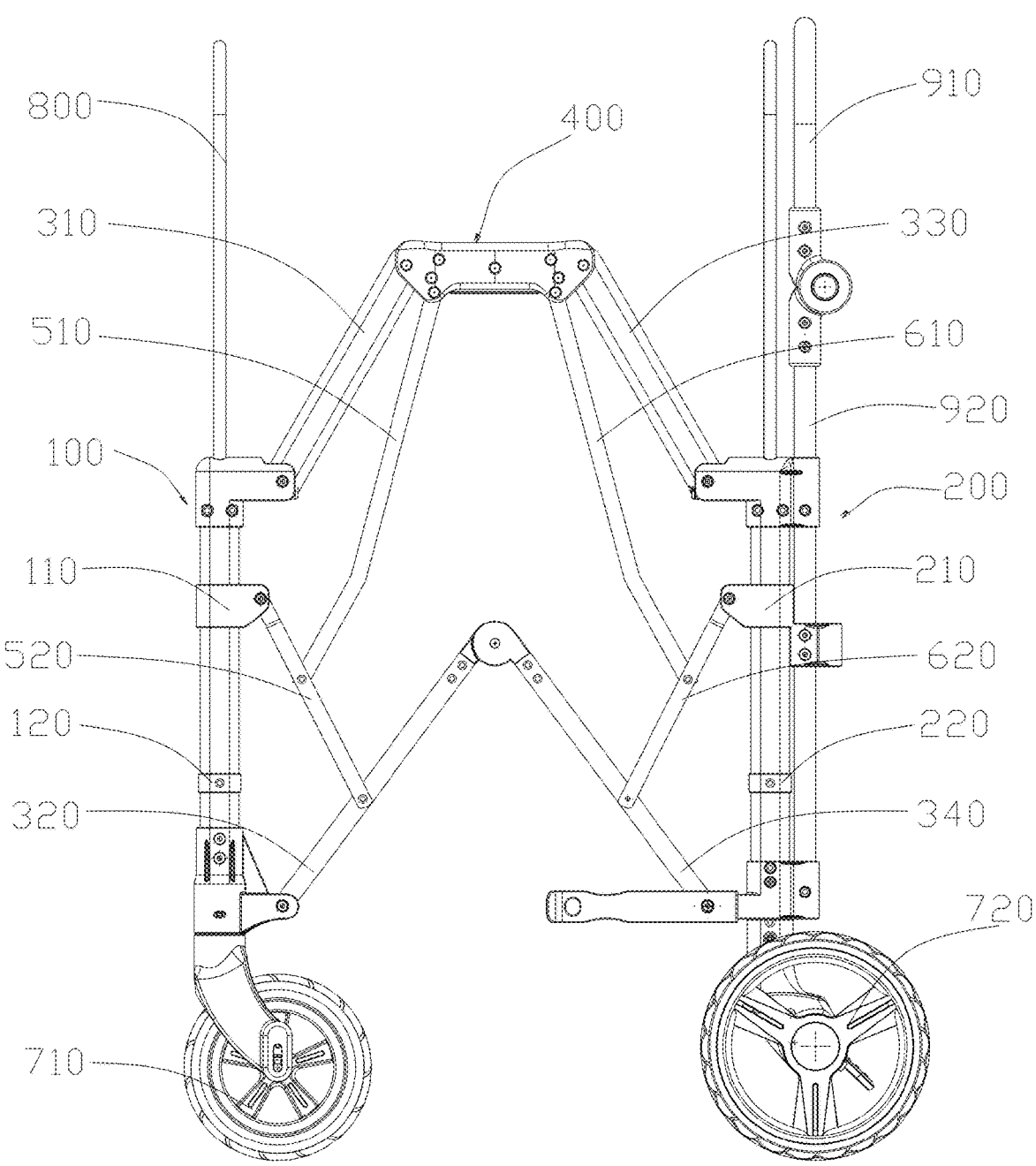
FIG. 13 is a side view of the stroller of FIG. 1 in a semi-folded state.
Figure 14:
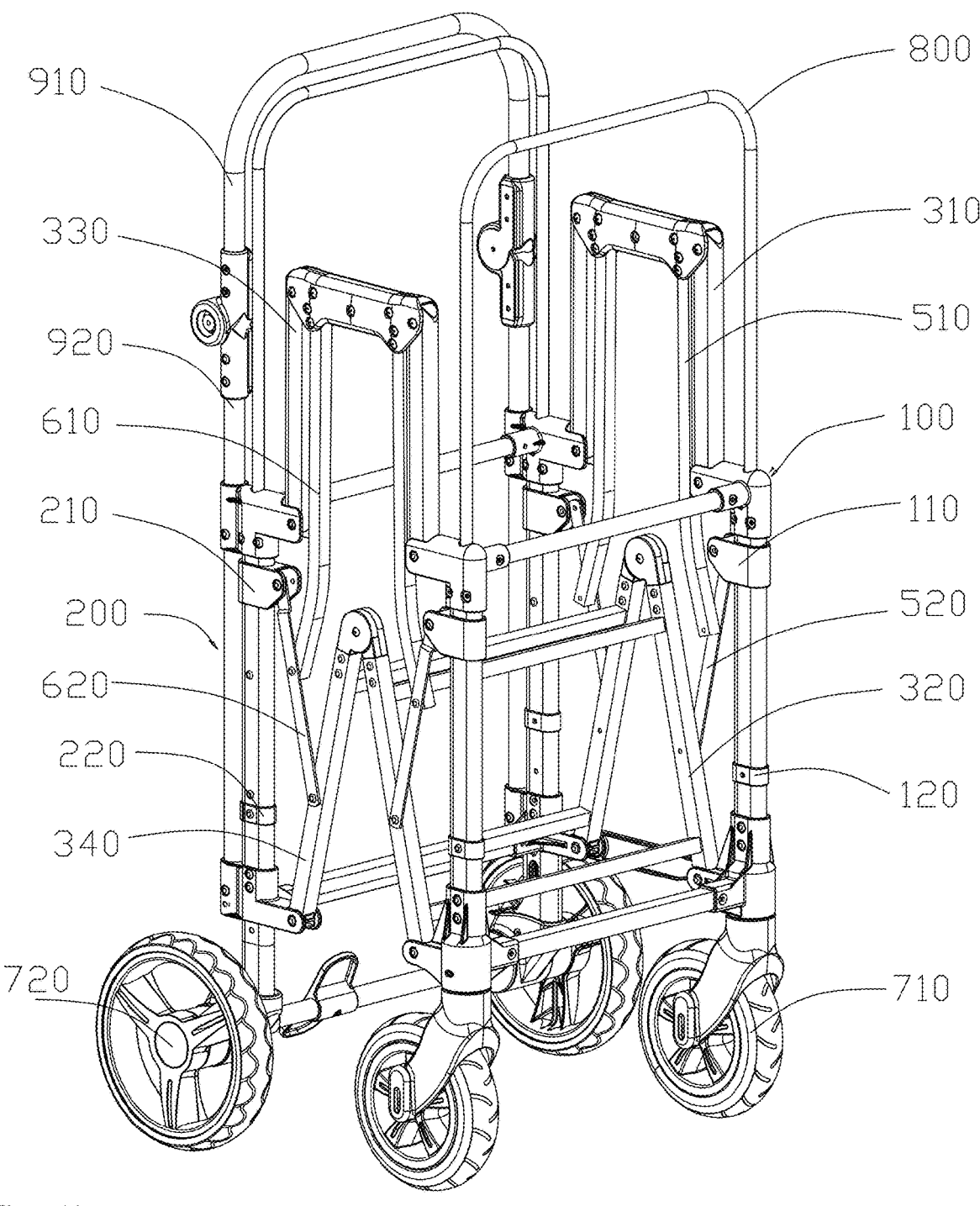
FIG. 14 is a schematic view of the overall structure of the stroller of FIG. 1 in a folded state.
Figure 15:
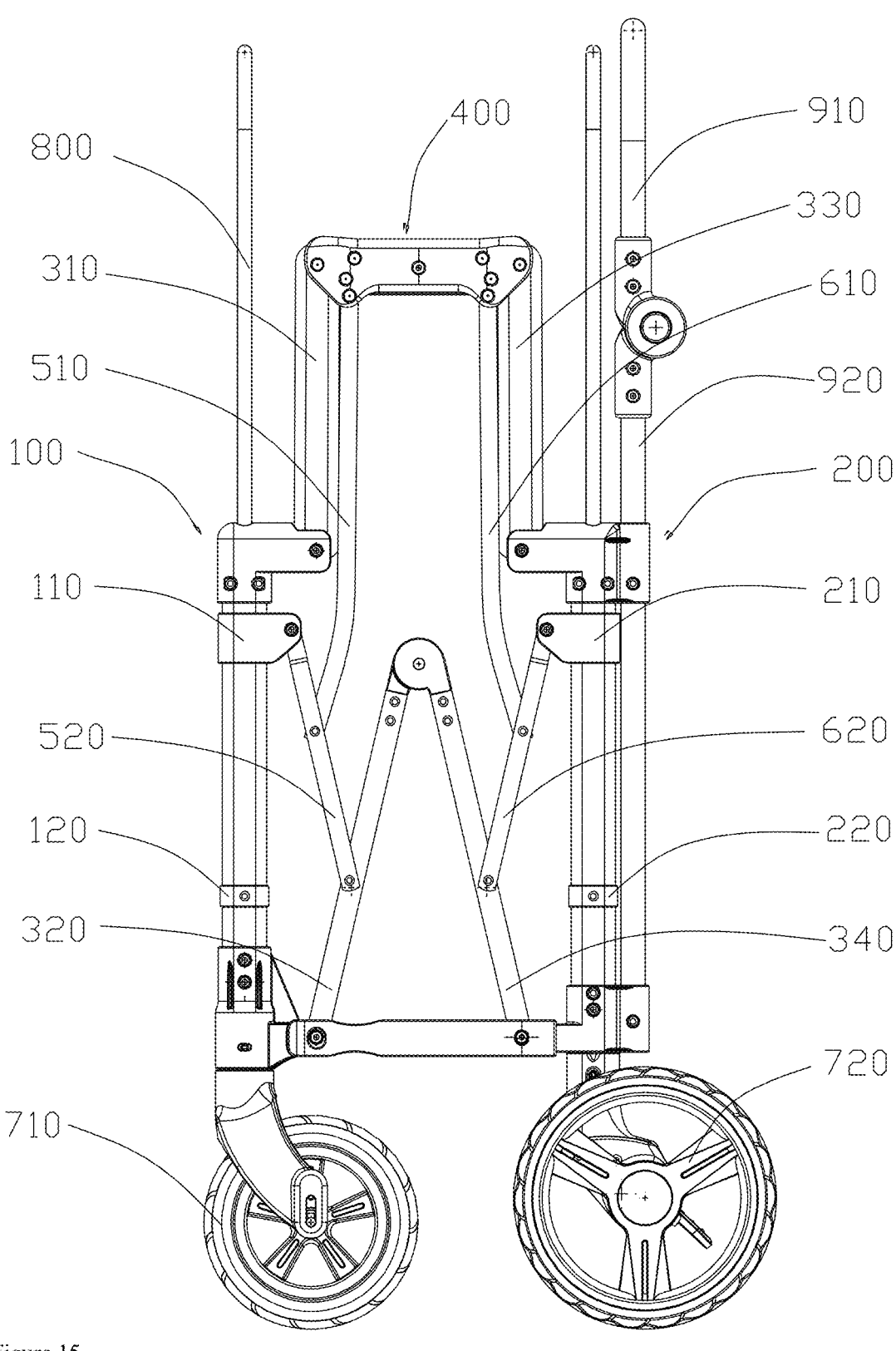
FIG. 15 is a side view of the stroller of FIG. 1 in a folded state.
Figure 16:
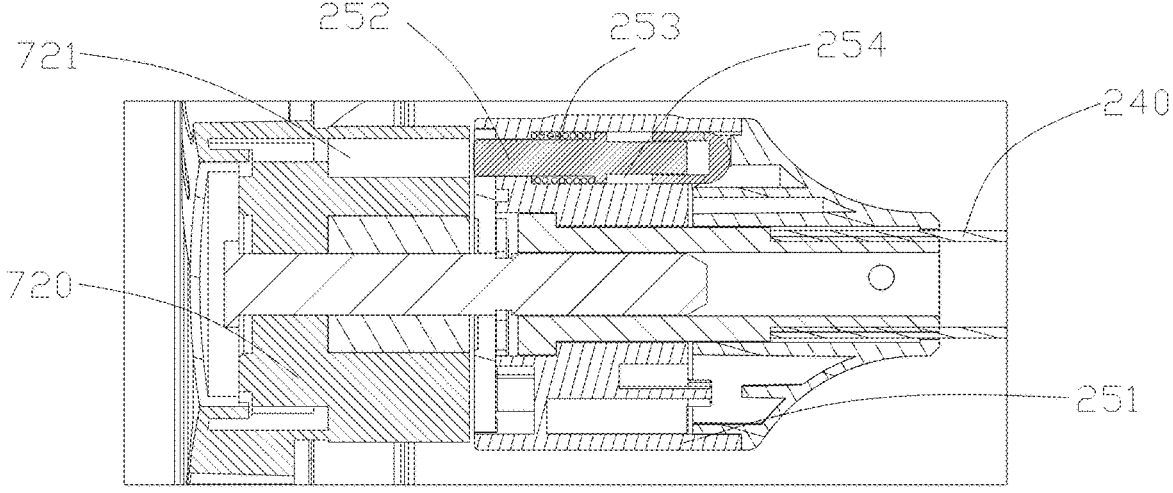
FIG. 16 is a partial cross-sectional view of the stroller of FIG. 1 with locking assemblies in a releasing state.
Figure 17:
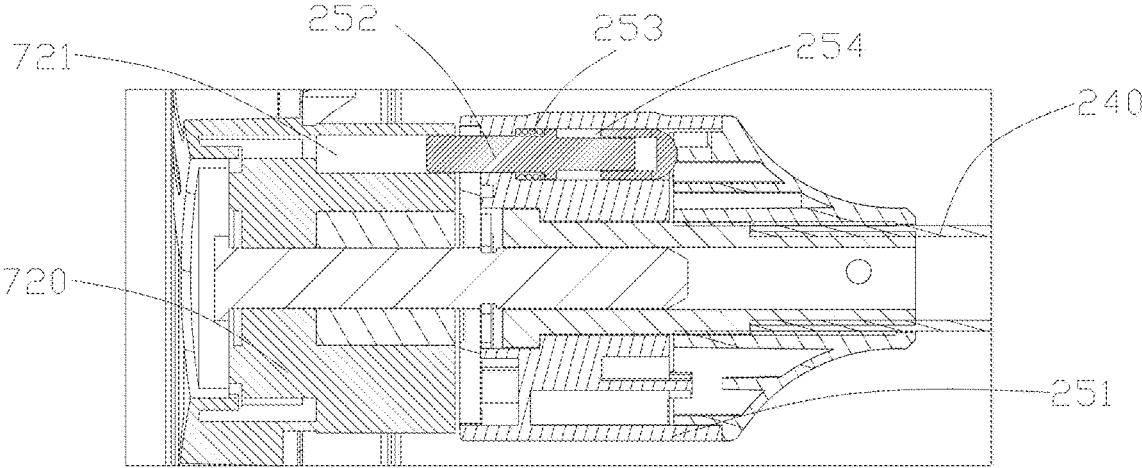
FIG. 17 is a partial cross-sectional view of the stroller of FIG. 1 with the locking assemblies in a locking state.
Figure 18:
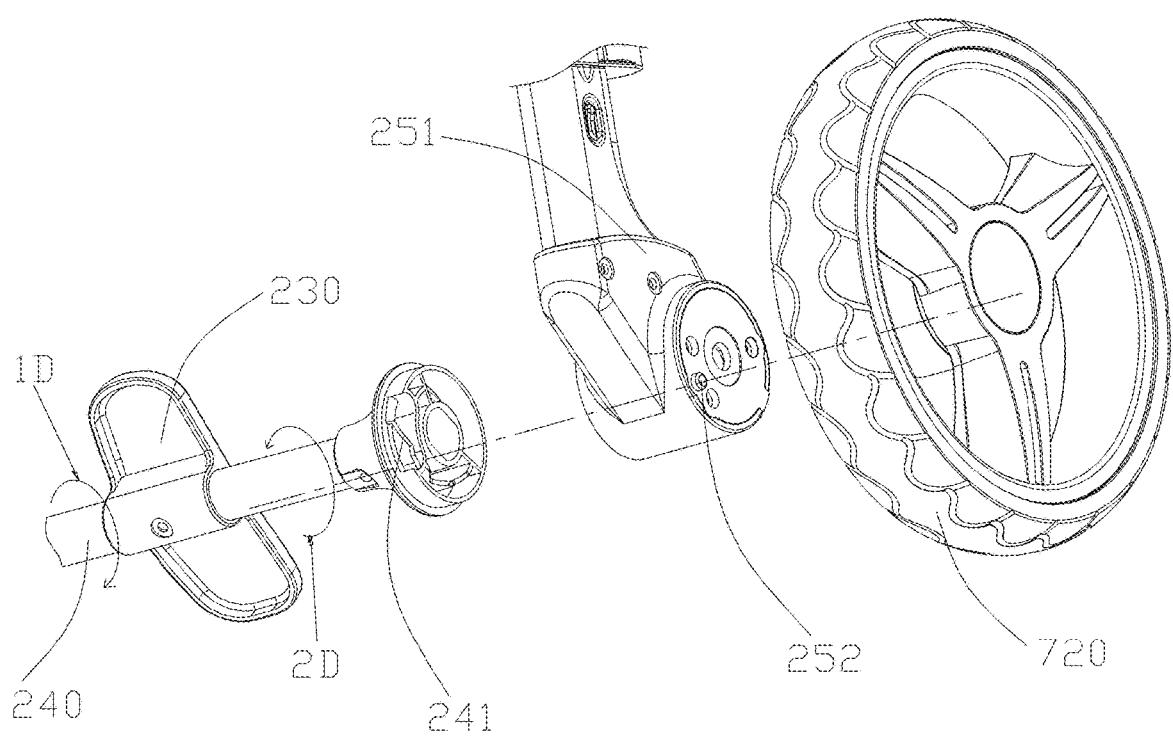
FIG. 18 is an exploded view of a portion of the stroller including a locking assembly.
Figure 19:
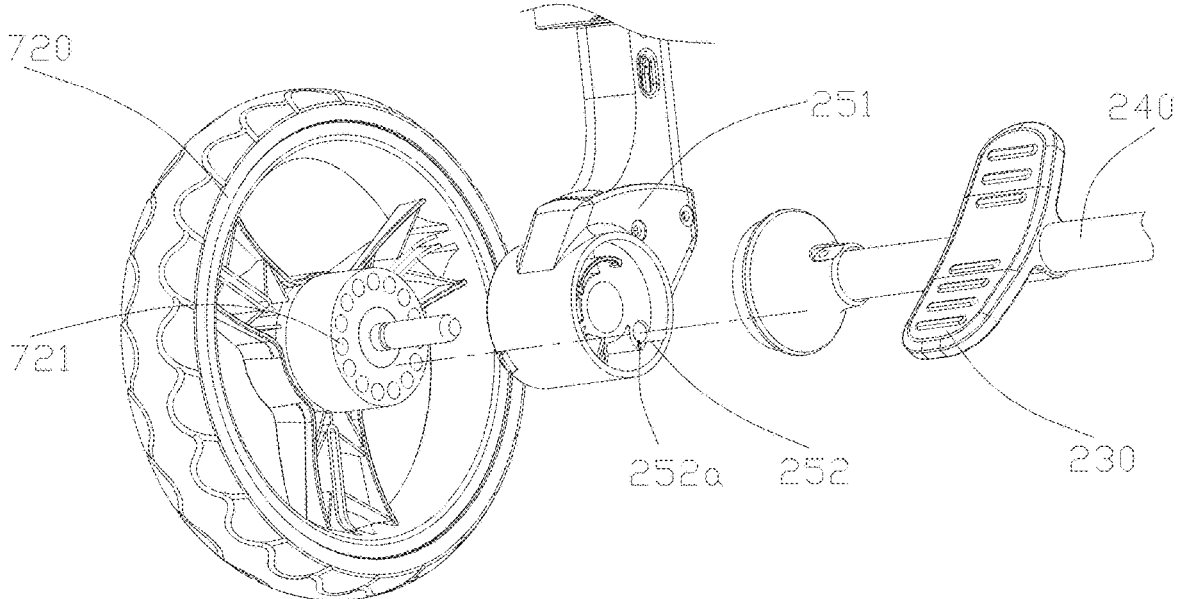
FIG. 19 is an exploded view of the portion of FIG. 18, viewed from another angle.

To make the above-mentioned purposes, features and advantages of the present application more obvious and understandable, the specific implementation modes of the present application will be described in detail below with reference to the accompanying drawings. A lot of specific details are set forth in the following description to facilitate a full understanding of the present application. However, the present application can be implemented in many other ways different from those described here, and those skilled in the art can make similar improvements without violating the connotation of the present application. Therefore, the present application is not limited by the specific embodiments disclosed below.

In the description of the present application, it should be understood that orientations or positional relationships indicated by terms such as "center", "longitudinal", "transverse", "length", "width", "thickness", "upper", "lower", "front", "rear", "left", "right", "vertical", "horizontal", "top", "bottom", "inner", "outer", "toward a first direction", "toward a second direction", "axial", "radial", and "circumferential" are orientations or positional relationships shown in the accompanying drawings. These terms are only for the convenience of describing the embodiments of the present application and simplifying the description, rather than indicating or implying that the referred device or element must have a specific orientation, or be constructed and operated in a specific orientation. Therefore, these terms should not be construed as limiting the present application.

In addition, terms "first" and "second" are only used for descriptive purposes and should not be understood as indicating or implying relative importance or implicitly specifying the number of the indicated technical features. Thus, a feature defined with "first" or "second" may explicitly or implicitly include at least one such feature. In the description of the present application, the term "plurality" means at least two such features (e.g., two, three, etc.), unless otherwise explicitly and specifically defined.

In the present application, unless otherwise clearly specified and limited, terms such as "installation", "connection", "linkage", and "fixation" should be understood in a broad sense. For example, the term "connection" may mean a fixed connection, a detachable connection, or an integral connection; the term "connection" may mean a mechanical connection or an electrical connection; the term "connection" may mean a direct connection, or an indirect connection through an intermediate medium, or the term "connection" may mean internal communication between two elements or an interaction relationship between two elements, unless otherwise clearly defined. For those of ordinary skill in the art, the specific meanings of the above terms in the present application can be understood according to specific circumstances.

In the present application, unless otherwise clearly specified and limited, a description such as "a first feature is 'on' or 'under' a second feature" may mean that the first feature and the second feature are in direct contact, or the first feature and the second feature are in indirect contact through an intermediate medium. Moreover, the description of "a first feature is 'on top of', 'above' or 'over' a second feature" may mean that the first feature is directly above or obliquely above the second feature, or simply mean that the horizontal position of the first feature is higher than that of the second feature. The description of "a first feature is 'below', 'under' or 'beneath' a second feature" may mean that the first feature is directly below or obliquely below the second feature, or simply mean that the horizontal position of the first feature is lower than that of the second feature.

It should be noted that if an element is referred to as being "fixed to" or "disposed on" another element, the element may be directly on the another element or there may be an intermediate element existing therebetween. If an element is considered to be "connected" to another element, the element may be directly connected to the another element or there may be an intermediate element existing therebetween. If applicable, the terms "vertical", "horizontal", "upper", "lower", "left", "right" and similar expressions used in the present application are only for descriptive purposes and do not restrict the present application to the single implementation manner.

With reference to FIGS. 1 to 19, an easy-to-fold stroller has a folded state and an unfolded state, and includes:

a front frame assembly 100;

a rear frame assembly 200;

two side frame assemblies 300 arranged between the front frame assembly 100 and the rear frame assembly 200 for unfolding and folding, each side frame assembly 300 including:

a front top rod 310 including a front end 31*a* and a rear end 31*b*, the front end 31*a* of the front top rod 310 being hinged to an upper side 10*a* of the front frame assembly 100;

a front bottom rod 320 including a front end 32*a* and a rear end 32*b*, the front end 32*a* of the front bottom rod 320 being hinged to a lower side 10*b* of the front frame assembly 100;

a rear top rod 330 including a front end 33*a* and a rear end 33*b*, the rear end 33*b* of the rear top rod 330 being hinged to an upper side 20*a* of the rear frame assembly 200;

a rear bottom rod 340 including a front end 34*a* and a rear end 34*b*, the rear end 34*b* of the rear bottom rod 340 being hinged to a lower side 20*b* of the rear frame assembly 200 and the front end 34*a* of the rear bottom rod 340 being hinged to the rear end 32*b* of the front bottom rod 320; and a locking assembly 400, two ends 40*a* and 40*b* of the locking assembly 400 being hinged to a rear end 31*b* of the front top rod 310 and a front end 33*a* of the rear top rod 330 respectively, and the locking assembly 400 including:

a locking housing 410;

a driving member 420 connected to the locking housing 410 and slidable between a first position 1H and a second position 2H;

two first reset members 430 disposed inside the locking housing 410; and two locking members 440, each locking member 440 being connected to the locking housing 410 and slidable between a locking position 3H and a releasing position 4H to lock or release the front top rod 310 and the rear top rod 330, each first reset member 430 is configured to impart a tendency to a corresponding one of the locking members 440 to move toward the locking position 3H, when the driving member 420 is moved from the first position 1H toward the second position 2H by an external force, the locking members 440 are driven by the driving member 420 to slide from the locking positions 3H toward the releasing positions 4H, thereby releasing the front top rod 310 and the rear top rod 330.

Through the above structure, when folding the stroller, the driving member 420 of each locking assembly 400 is pressed by a user and moved from the first position 1H toward the second position 2H. The driving member 420 pushes the locking members 440 to move the locking members 440 from the locking position 3H toward the releasing position 4H. The locking assemblies 400 release the front top rods 310 and the rear top rods 330 of the two side frame assemblies 300 to allow relative rotation of connected components, and at the meantime the locking assemblies 400 are pulled upward by the user to fold the stroller. When the stroller is in the unfolded state, axes of the front top rod 310 and the rear top rod 330 of each side frame assembly 300 are substantially on the same line. The first reset members 430 of each locking assembly 400 drive the two locking members 440 to lock the front top rod 310 and the rear top rod 330 of the corresponding side frame assembly 300 respectively, so as to prevent relative rotation of the connected components and ensure the stability of the stroller.

In this embodiment, each locking assembly 400 further includes a second reset member 450 disposed inside the locking housing 410. The second reset member 450 endows the driving member 420 with a tendency to move toward the first position 1H. Through this structural configuration, when the user presses the driving member 420, the driving member 420 is moved from the first position 1H toward the second position 2H, and the second reset member 450 is forced to deform. When the user releases the driving member 420, the second reset member 450 returns to its original position, causing the driving member 420 to move from the second position 2H toward the first position 1H. The second reset member 450 enables automatic reset of the driving member 420, improving the user experience of the stroller.

In this embodiment, each locking member 440 is equipped with a clamping block 441, and both the rear end 31*b* of the front top rod 310 and the front end 33*a* of the rear top rod 330 of the corresponding side frame assembly 300 are provided with a clamping groove 301. When each locking member 440 is in the locking position 3H, the respective clamping block 441 is engaged in a corresponding clamping groove 301. Through this structural configuration, when the stroller is in the unfolded state, the clamping blocks 441 of the locking members 440 are aligned with the clamping grooves 301 one to one. The first reset member 430 drives the locking members 440 to move, causing the clamping blocks 441 to be inserted into the clamping grooves 301. This prevents relative rotation between each of the front top rod 310 and the rear top rod 330 of the corresponding side frame assembly 300 and the locking housing 410, and further ensures the overall structural stability of the stroller.

In this embodiment, the rear end 31*b* of the front top rod 310 and the front end 33*a* of the rear top rod 330 of the corresponding side frame assembly 300 are both provided with end parts 302. The end parts 302 have arc-shaped surfaces: each clamping groove 301 is located at a vertex of the arc-shaped surface of the corresponding end part 302. When the stroller is switched from the unfolded state to the folded state, the clamping blocks 441 abut against the arc-shaped surfaces and slide along the arc-shaped surfaces. Through this structural configuration, when the stroller is switched between the unfolded state and the folded state, the clamping blocks 441 disengage from the clamping grooves 301 to allow relative rotation between each of the front top rod 310 and the rear top rod 330 and the locking housing 410. Moreover, the two locking members 440 are endowed by the first reset member 430 with a tendency to move toward the locking positions 3H, so that the clamping blocks 441 abut against the arc-shaped surfaces of the end parts 302. The arc-shaped surfaces facilitate easier relative rotation between each of the front top rod 310 and the rear top rod 330 and the locking housing 410, making the state switching more smoothly without jamming.

In this embodiment, the driving member 420 is provided with a driving part 421, and each locking member 440 is provided with a driven part 442. The driven part 442 abuts against a surface of the driving part 421 and is slidable along the surface of the driving part 421. With this structural configuration, a first inclined surface on the driving part 421 abuts against a second inclined surface on the driven part 442. When the driving member 420 moves from the first position 1H toward the second position 2H (i.e., moves upward), the driving part 421 moves upward synchronously. The second inclined surface slides relative to the first inclined surface, and a horizontal component force applied to the second inclined surface drives the locking member 440 to move in a horizontal direction (i.e., move from the locking position 3H toward the releasing position 4H).

In this embodiment, each locking member 440 is provided with a limiting part 443. When the locking members 440 reach the releasing positions 4H, the driving part 421 abuts against the limiting parts 443. With this structural arrangement, when the locking members 440 reach the releasing positions 4H, the clamping blocks 441 has been disengaged from the corresponding clamping grooves 301, allowing relative rotation between each of the front top rod 310 and the rear top rod 330 and the locking housing 410. At this time, no further movement of the driving member 420 is required, and the limiting parts 443 effectively restrict the stroke of the driving part 421. This prevents damage to the stroller caused by excessive force applied by the user when pressing the driving member 420, thereby ensuring the service life of the stroller.

In this embodiment, the locking housing 410 is provided with a first sliding block 411, and the driving member 420 is provided with a first slotted hole 424. A length of the first slotted hole 424 is oriented substantially in a vertical direction. The first sliding block 411 is received in the first slotted hole 424 and slidable along the length of the first slotted hole 424. With this structural arrangement, when the user presses the driving member 420 to move the driving member 420 from the first position 1H toward the second position 2H, the first sliding block 411 slides in the first slotted hole 424, which limits a sliding direction of the driving member 420 and ensures the stability of the stroller. Moreover, during the assembly process of the stroller, the first sliding block 411 and the first slotted hole 424 can play a positioning role, thereby improving the assembly efficiency of the stroller.

In this embodiment, each locking member 440 is provided with a second slotted hole 444. A length of the second slotted hole 444 is substantially oriented in the horizontal direction. The locking housing 410 is provided with two second sliding blocks 412. The second sliding blocks 412 are received in the second slotted holes 444 and are slidable along the second slotted holes 444. With this structural configuration, when the user presses the driving member 420 to move the driving member 420 from the first position 1H toward the second position 2H, the driving part 421 urges the driven parts 442 to move the locking members 440 in the horizontal direction. At this time, the second sliding blocks 412 slides within the second slotted holes 444, restricting the locking members 440 to horizontal movement only. This ensures that the locking members 440 can lock or release the front top rod 310 and the rear top rod 330, thereby enhancing the structural stability of the stroller. Furthermore, during the assembly process of the stroller, the second sliding blocks 412 and the second slotted holes 444 can play a positioning role, thereby improving the assembly efficiency of the stroller.

In this embodiment, the locking housing 410 is provided with two abutment plates 413 extending in the vertical direction. Each locking member 440 is provided with a first spring groove 445. The first reset members 430 are at least partially received in the first spring grooves 445 one to one, a first end 43a of each first reset member 430 abuts against a bottom wall 445a of the corresponding first spring groove 445, and a second end 43b of each first reset member 430 abuts against the corresponding abutment plate 413. With this structural configuration, the abutment plates 413 support and fix the first ends 43a of the first reset members 430, while the bottom walls 445a of the first spring grooves 445 support and fix the second ends 43b of the first reset members 430. This enables the elastic force exerted by the first reset members 430 to act stably on the locking housing 410 and the locking members 440. When the user releases the driving member 420, the first reset members 430 are able to effectively drive the locking members 440 to slide from the releasing positions 4H toward the locking positions 3H, thereby locking the front top rod 310 and the rear top rod 330 and making the stroller more convenient to use. Furthermore, side walls of the first spring grooves 445 prevent the first reset members 430 from shifting or popping out and further ensuring the stability of the stroller.

In this embodiment, a sliding space 414 is defined between the two abutment plates 413. The driving member 420 is provided with a sliding part 422. The sliding part 422 is at least partially received in the sliding space 414 and slidable in the sliding space 414. With this structural configuration, the sliding part 422 is at least partially received in the sliding space 414, and the two abutment plates 413 abut against two opposite side walls of the sliding part 422 respectively, restricting the driving member 420 to vertical movement only. This ensures the stability of the driving member 420 during frequent movements and extends the service life of the stroller.

In this embodiment, the sliding part 422 is provided with a second spring groove 423. The second reset member 450 is at least partially received in the second spring groove 423, a first end 45a of the second reset member 450 abuts against a bottom wall 423a of the second spring groove 423, and a second end 45b of the second reset member 450 abuts against an inner wall 41b of the locking housing 410. With this structural configuration, when the user presses the driving member 420 to move the driving member 420 from the first position 1H toward the second position 2H, the second reset member 450 deforms. Side walls of the second spring groove 423 restrict the second reset member 450 to vertical deformation only and prevent the second reset member 450 from horizontal displacement. When the user releases the driving member 420, the elastic force of the second reset member 450 drives the driving member 420 to move from the second position 2H toward the first position 1H and reset.

In this embodiment, the stroller further includes two front support assemblies 500 and two rear support assemblies 600. An upper end 50a of each front support assembly 500 and an upper end 60a of each rear support assembly 600 are both hinged to the locking housing 410 of the corresponding locking assembly 400. A lower end 50b of the front support assembly 500 is hinged to the front bottom rod 320 of the corresponding side frame assembly 300 and/or the front frame assembly 100, and a lower end 60b of the rear support assembly 600 is hinged to the rear bottom rod 340 of the corresponding side frame assembly 300 and/or the rear frame assembly 200.

In this embodiment, each front support assembly 500 includes a first front support rod 510 and a second front support rod 520. The front frame assembly 100 is equipped with two front sliding blocks 110, and each front sliding block 110 is slidable on the front frame assembly 100. A lower end 52b of each second front support rod 520 is hinged to the front bottom rod 320 of the corresponding side frame assembly 300, and an upper end 52a of each second front support rod 520 is hinged to a corresponding one of the front sliding blocks 110. An upper end 51a of each first front support rod 510 is hinged to the locking housing 410 of the corresponding locking assembly 400, and a lower end 51b of each first front support rod 510 is hinged to a middle part of the corresponding second front support rod 520. Each rear support assembly 600 includes a first rear support rod 610 and a second rear support rod 620. The rear frame assembly 200 is equipped with two rear sliding blocks 210, and each rear sliding block 210 is slidable on the rear frame assembly 200. A lower end 62*b* of each second rear support rod 620 is hinged to the rear bottom rod 340 of the corresponding side frame assembly 300, and an upper end 62*a* of each second rear support rod 620 is hinged to a corresponding one of the rear sliding blocks 210. An upper end 61*a* of each first rear support rod 610 is hinged to the locking housing 410 of the corresponding locking assembly 400, and a lower end 61*b* of each first rear support rod 610 is hinged to a middle part of the corresponding second rear support rod 620.

In this embodiment, the front frame assembly 100 is provided with two front limiting blocks 120, and the rear frame assembly 200 is provided with two rear limiting blocks 220. When the stroller is in the unfolded state, each front sliding block 110 abuts against a corresponding one of the front limiting blocks 120, and each rear sliding block 210 abuts against a corresponding one of the rear limiting blocks 220. With this structural configuration, a lower surface of each front sliding block 110 abuts against an upper surface of the corresponding front limiting block 120, and a lower surface of each rear sliding block 210 abuts against an upper surface of the corresponding rear limiting block 220. This holds the front sliding blocks 110 and the rear sliding blocks 210 in place and prevents the front sliding blocks 110 and the rear sliding blocks 210 from sliding further downward. In this embodiment, two ends 52*a* and 52*b* of each second front support rod 520 are supported on the front bottom rod 320 and the front frame assembly 100 respectively: two ends 62*a* and 62*b* of each second rear support rod 620 are supported on the rear bottom rod 340 and the rear frame assembly 200 respectively: the two ends 51*a* and 51*b* of each first front support rod 510 are supported on the middle part of the corresponding second front support rod 520 and the locking housing 410 respectively; and the two ends 61*a* and 61*b* of each first rear support rod 610 are supported on the middle part of the corresponding second rear support rod 620 and the locking housing 410 respectively. This structural configuration can distribute the forces applied to the front top rods 310 and the rear top rods 330 to the front frame assembly 100, the rear frame assembly 200, the front bottom rods 320, and the rear bottom rods 340, making the stroller more stable, sturdier and more durable.

When folding the stroller, the upper end 50*a* of each front support assembly 500 and the upper end 60*a* of each rear support assembly 600 rotate relative to the locking housing 410 around their respective hinge points. The upper ends 51*a* and 61*a* of both the first front support rods 510 and the first rear support rods 610 rotate relative to the locking housing 410. The lower end 51*b* of each first front support rod 510 rotates relative to the corresponding second front support rod 520, and the lower end 61*b* of each first rear support rod 610 rotates relative to the corresponding second rear support rod 620. The two ends 52*a* and 52*b* of each second front support rod 520 rotate relative to the corresponding front sliding block 110 and the front bottom rod 320 of the corresponding side frame assembly 300 respectively, and the two ends 62*a* and 62*b* of each second rear support rod 620 rotate relative to the corresponding rear sliding block 210 and the rear bottom rod 340 of the corresponding side frame assembly 300 respectively. At the same time, the front sliding blocks 110 slide upward along a main body of the front frame assembly 100, and the rear sliding blocks 210 slide upward along a main body of the rear frame assembly 200. The front frame assembly 100 and the rear frame assembly 200 move closer to each other, and the stroller is changed to the folded state, which reduces the volume of the stroller, and facilitates storage and transportation by the user.

In this embodiment, the stroller further includes swivel wheels 710 and fixed wheels 720. The swivel wheels 710 are connected to the bottom of the front frame assembly 100, and the fixed wheels 720 are connected to the bottom of the rear frame assembly 200. With this structural configuration, the swivel wheels 710 and the fixed wheels 720 cooperate to facilitate the user in moving the stroller, making it easier and less labor-intensive to transport children or carry items. Moreover, the swivel wheels 710 can rotate around a vertical axis to change direction, thereby facilitating the user to change the moving direction of the stroller with simple operation.

In this embodiment, the rear frame assembly 200 is further provided with a driving pedal 230, a driving rod 240, and two wheel-locking assemblies 250. Under an external force, the driving pedal 230 and the driving rod 240 rotate around a central axis of the driving rod 240, so that the wheel-locking assemblies 250 lock or release the fixed wheels 720. With this structural configuration, when the user steps on the driving pedal 230, the driving pedal 230 drives the driving rod 240 to rotate in a first direction ID, which in turn drives the wheel-locking assemblies 250 to lock the fixed wheels 720. When to release the fixed wheels 720, the user lifts the driving pedal 230 upward, and the driving pedal 230 drives the driving rod 240 to rotate in a second direction 2D, thereby driving the wheel-locking assemblies 250 to release the fixed wheels 720.

In this embodiment, the fixed wheels 720 are provided with a number of locking holes 721. Each wheel-locking assembly 250 includes a connecting housing 251, a telescopic rod 252, and a return spring 253. A rod-locking slot 254 is provided in the connecting housing 251. The telescopic rod 252 is mounted in the rod-locking slot 254 and slides between a locked position to be engaged in a corresponding one of the locking holes 721 and a released position to be disengaged from the corresponding locking hole 721. The return spring 253 imparts a tendency to the telescopic rod 252 to slide toward the released position.

In this embodiment, each end of the driving rod 240 is provided with a driving inclined surface 241, and first ends 252*a* of the telescopic rods 252 abut against the driving inclined surfaces 241 of the driving rod 240 correspondingly. When the driving rod 240 rotates in the first direction ID, the driving inclined surfaces 241 drive the telescopic rods 252 to be engaged in the locking holes 721. When the driving rod 240 rotates in the second direction 2D, the return springs 253 drive the telescopic rods 252 to be disengaged from the locking holes 721. With this structural configuration, two connecting housings 251 are fixedly connected to the lower end of the rear frame assembly 200, and the driving rod 240 is arranged between the two connecting housings 251. When the stroller needs to be parked, the user steps down on the driving pedal 230, the driving pedal 230 then drives the driving rod 240 to rotate in the first direction ID. The driving inclined surfaces 241 provided at both ends of the driving rod 240 rotate accordingly, pushing the telescopic rods 252 to slide outward and insert into the locking holes 721. The fixed wheels 720 are thus locked, keeping the stroller stably on the ground for user convenience. When the stroller needs to be pushed forward, the user lifts the driving pedal 230 upward, the driving pedal 230 then drives the driving rod 240 to rotate in the second direction 2D. The driving inclined surfaces 241 at both ends of the driving rod 240 rotate accordingly; meanwhile, the return springs 253 drive the telescopic rods 252 to slide inward and detach from the locking holes 721. The fixed wheels 720 are thus released and can rotate again, facilitating the user to push the stroller.

In this embodiment, the rear end 32b of each front bottom rod 320 is provided with a first pivot member 321, and the front end 34a of each rear bottom rod 340 is provided with a second pivot member 341. One of the first pivot member 321 and the second pivot member 341 is provided with a limiting post 303, and the other one of the first pivot member 321 and the second pivot member 341 is provided with a semi-circular limiting slot 304. The limiting post 303 is inserted into the semi-circular limiting slot 304. When the stroller is in the unfolded state, the limiting post 303 abuts against an end wall 304a of the semi-circular limiting slot 304. With this structural configuration, when the stroller is in the unfolded state, the front bottom rod 320 and the rear bottom rod 340 of each side frame assembly 300 are positioned on the same horizontal plane. The limiting post 303 abuts against the end wall 304a of the semi-circular limiting slot 304, thereby preventing the front bottom rod 320 and the rear bottom rod 340 from further rotation. The front bottom rod 320 and the rear bottom rod 340 then cooperate to form a stable bottom support platform, which prevents the middle part of the stroller from collapsing downward and enhances its overall stability. When the user needs to fold the stroller, a hinge center of the front bottom rod 320 and the rear bottom rod 340 of each side frame assembly 300 moves upward, the front bottom rod 320 and the rear bottom rod 340 rotate relative to each other, and the limiting post 303 slides along the semi-circular limiting slot 304, which allows the stroller to be folded more smoothly.

In this embodiment, there are two limiting posts 303 and two semi-circular limiting slots 304. The two limiting posts 303 are received in the two semi-circular limiting slots 304 in a one-to-one manner, and a distance H between one limiting post 303 and a pivot 305 is different from a distance h between another limiting post 303 and the pivot 305. With this structural configuration, the two limiting posts 303 are received in the two semi-circular limiting slots 304 in a one-to-one manner. When the stroller is in the unfolded state, the front bottom rod 320 and the rear bottom rod 340 of each side frame assembly 300 are positioned on the same horizontal plane, and the two limiting posts 303 abut against the end walls 304a of the semi-circular limiting slots 304. This forms two supporting points, rendering the connection between the front bottom rod 320 and the rear bottom rod 340 more stable. The two semi-circular limiting slots 304 are concentrically arranged. When the user needs to fold the stroller, the two limiting posts 303 slide respectively in the two semi-circular limiting slots 304 during the folding process. The front bottom rod 320 and the rear bottom rod 340 are rotated about the pivot 305, and the stroller is thus switched between the folded state and the unfolded state.

In this embodiment, the stroller further includes a sunshade bracket 800. The sunshade bracket 800 is detachably connected to an upper end of the front frame assembly 100 and/or an upper end of the rear frame assembly 200, and the sunshade bracket 800 is configured for connecting a sunshade. With this structural configuration, the user can connect the sunshade to the sunshade bracket 800, and the sunshade can cover an upper opening of the stroller, providing shade for the user and improving the user experience.

In this embodiment, the stroller further includes a push rod assembly 900. The push rod assembly 900 includes a connecting rod 910 and a handle 920. The connecting rod 910 is connected to the rear frame assembly 200, and the handle 920 is rotatably connected to the push rod assembly 900. With this structural configuration, the user can rotate the handle 920 to a proper position and then fix the handle 920, so that the user can grasp the handle 920 more comfortably to control the movement of the stroller. When folding and storing the stroller, the handle 920 can be rotated downward to close to the connecting rod 910, thereby reducing a storage volume of the stroller and facilitating the user to transport and store the stroller.

Figure 20:
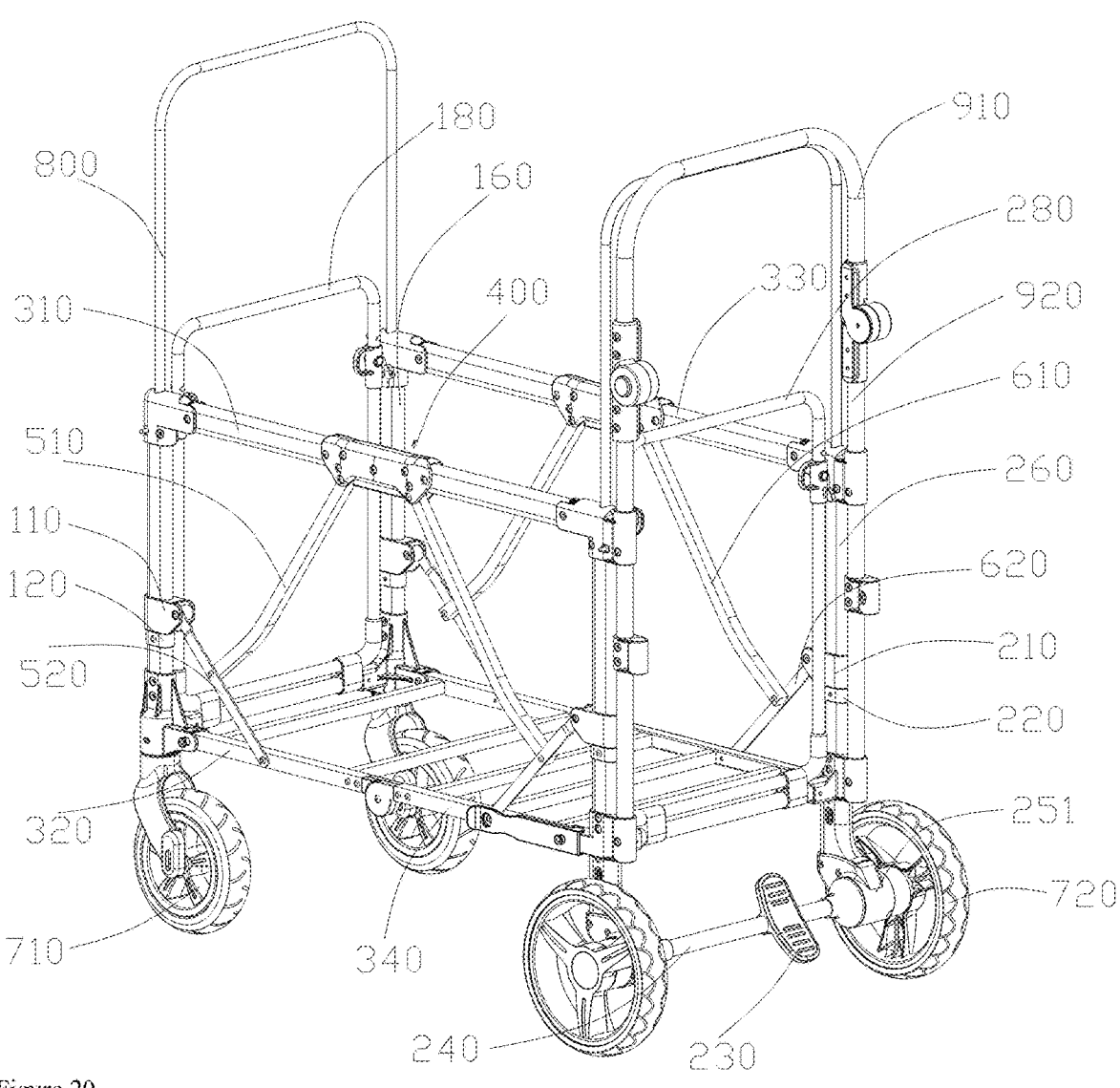
FIG. 20 is a schematic view of the overall structure of a stroller in a folded state according to another embodiment of the present application.
Figure 21:
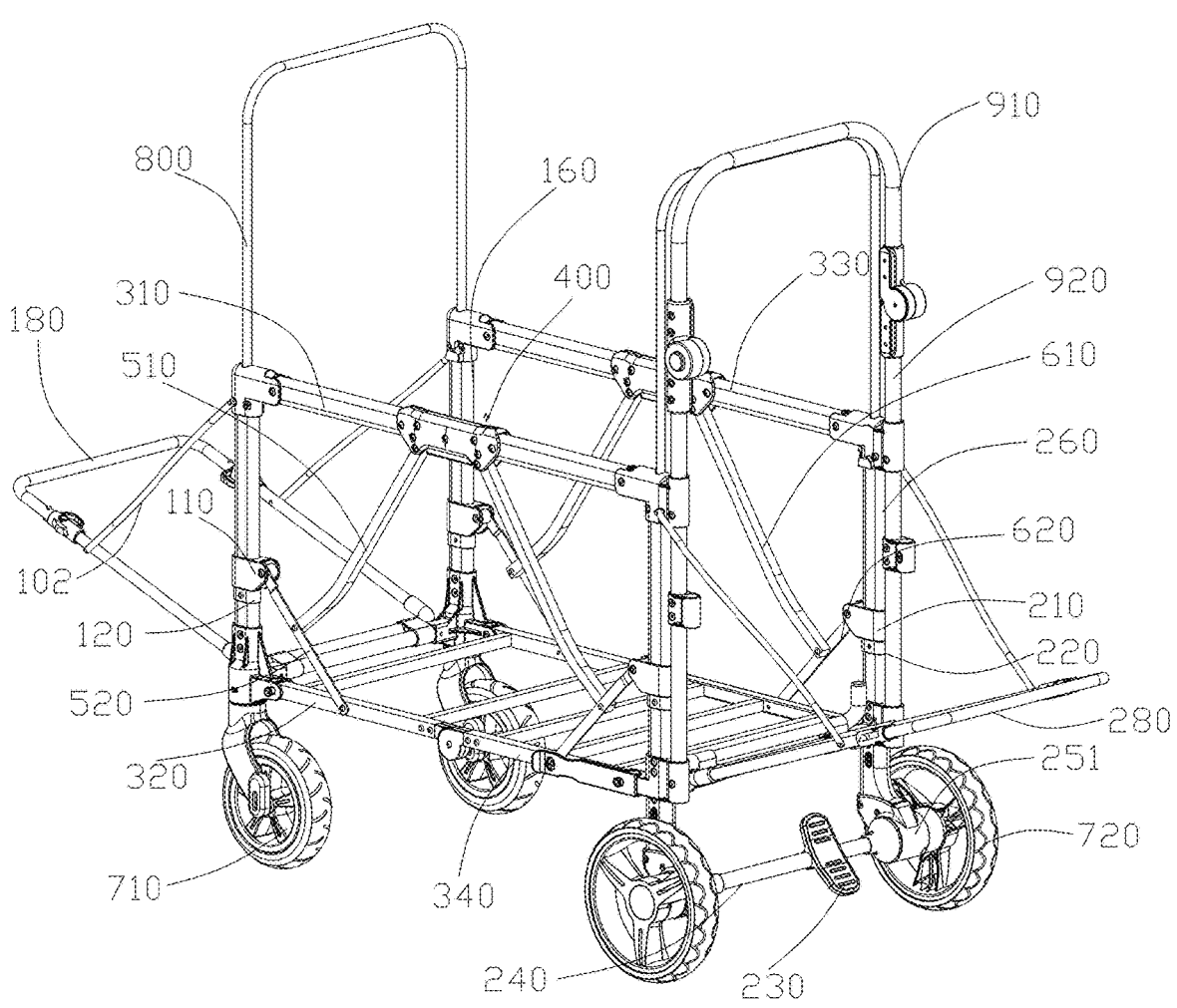
FIG. 21 is a schematic view of the overall structure of the stroller in an unfolded state according to another embodiment of the present application.

With reference to FIGS. 20 to 21, in another embodiment of the present invention, the front frame assembly 100 includes a first outer frame 160 and a first inner frame 180, and the rear frame assembly 200 includes a second outer frame 260 and a second inner frame 280. A lower end of the first inner frame 180 is rotatably connected to a lower end of the first outer frame 160, and an upper end of the first inner frame 180 is detachably engaged with an upper end of the first outer frame 160. A lower end of the second inner frame 280 is rotatably connected to a lower end of the second outer frame 260, and an upper end of the second inner frame 280 is detachably engaged with an upper end of the second outer frame 260. When the stroller is in the unfolded state, the upper end of the first inner frame 180 can be engaged with the upper end of the first outer frame 160, and the upper end of the second inner frame 280 can be engaged with the upper end of the second outer frame 260. The first outer frame 160 and the first inner frame 180 are generally positioned in a plane, and the second outer frame 260 and the second inner frame 280 are generally positioned in another plane, which improves the strength of the front frame assembly 100 and the rear frame assembly 200 and prolongs the service life of the stroller. Alternatively, the upper end of the first inner frame 180 can be detached from the upper end of the first outer frame 160, and the upper end of the second inner frame 280 can be detached from the upper end of the second outer frame 260. The first inner frame 180 is tilted forward and a pulling member 102 is configured to fix the first inner frame 180, thereby fixing an angle between the first inner frame 180 and the first outer frame 160. The second inner frame 280 is tilted backward and another pulling member 102 is used to fix the second inner frame 280, thereby fixing an angle between the second inner frame 280 and the second outer frame 260. The stroller is thus in an expanded state, with its space enlarged. Furthermore, the tilted first inner frame 180 and second inner frame 280 can serve as inclined backrests, allowing children in the stroller to lean against the first inner frame 180 and/or the second inner frame 280, thereby improving the user experience. In an embodiment, each of the pulling members 102 can be a foldable rod, a telescopic rod or a rope.

The invention claimed is:

1. An easy-to-fold stroller having a folded state and an unfolded state, comprising:
   a front frame assembly;
   a rear frame assembly; and
   two side frame assemblies arranged between the front frame assembly and the rear frame assembly for unfolding and folding, wherein each side frame assembly comprises:
   a front top rod comprising a front end and a rear end, the front end of the front top rod being hinged to an upper side of the front frame assembly;
   a front bottom rod comprising a front end and a rear end, the front end of the front bottom rod being hinged to a lower side of the front frame assembly;

a rear top rod comprising a front end and a rear end, the rear end of the rear top rod being hinged to an upper side of the rear frame assembly;

a rear bottom rod comprising a front end and a rear end, the rear end of the rear bottom rod being hinged to a lower side of the rear frame assembly and the front end of the rear bottom rod being hinged to the rear end of the front bottom rod; and a locking assembly comprising two ends hinged to the rear end of the front top rod and the front end of the rear top rod respectively, wherein the locking assembly further comprises:

a locking housing;

a driving member connected to the locking housing and slidable between a first position and a second position;

two first reset members disposed inside the locking housing; and two locking members, each locking member being connected to the locking housing and slide between a locking position and a releasing position to lock or release the front top rod and the rear top rod, wherein each first reset member is configured to impart a tendency to a corresponding one of the locking members to move toward the locking positions, when the driving member is moved from the first position toward the second position by an external force, each locking member is driven by the driving member to slide from the locking position toward the releasing position, thereby releasing the front top rod and the rear top rod.

2. The easy-to-fold stroller according to claim 1, wherein the locking assembly further includes a second reset member disposed inside the locking housing and configured to impart a tendency to the driving member to move toward the first position.

3. The easy-to-fold stroller according to claim 2, wherein the locking housing is provided with two abutment plates extending in a vertical direction, each locking member is provided with a first spring groove, each first reset member is at least partially received in the corresponding first spring groove, two ends of each first reset member abut against a bottom wall of the corresponding first spring groove and the corresponding abutment plate respectively.

4. The easy-to-fold stroller according to claim 3, wherein a sliding space is defined between the two abutment plates, the driving member is provided with a sliding part, and the sliding part is at least partially received in the sliding space and is slidable in the sliding space.

5. The easy-to-fold stroller according to claim 4, wherein the sliding part is provided with a second spring groove, the second reset member is at least partially received in the second spring groove, and two ends of the second reset member abut against a bottom wall of the second spring groove and an inner wall of the locking housing respectively.

6. The easy-to-fold stroller according to claim 1, wherein each locking member is provided with a clamping block, and both the rear end of the front top rod and the front end of the rear top rod are provided with a clamping groove, when the locking members are in the locking positions, the clamping blocks are engaged in the clamping grooves.

7. The easy-to-fold stroller according to claim 6, wherein each of the rear end of the front top rod and the front end of the rear top rod is provided with an end part having an arc-shaped surface, the clamping grooves are disposed at vertices of the arc-shaped surfaces of the end parts respectively, the clamping blocks are configured to abut against the arc-shaped surfaces and slide along the arc-shaped surfaces when the easy-to-fold stroller is switched from the unfolded state to the folded state.

8. The easy-to-fold stroller according to claim 1, wherein the driving member is provided with a driving part, each locking member is provided with a driven part, and the driven parts are abutted against the driving part and slidable along the driving part.

9. The easy-to-fold stroller according to claim 8, wherein the locking members are provided with limiting parts, the driving part is abutted against the limiting parts when the locking members are in the releasing positions.

10. The easy-to-fold stroller according to claim 9, wherein the locking housing is provided with a first sliding block, the driving member is provided with a first slotted hole whose length is substantially oriented in a vertical direction, and the first sliding block is received in the first slotted hole and is slidable along the length of the first slotted hole.

11. The easy-to-fold stroller according to claim 1, wherein each locking member is provided with a second slotted hole whose length is substantially oriented in a horizontal direction, the locking housing is provided with two second sliding blocks, and the second sliding blocks are received in the second slotted holes one to one and are slidable along the lengths of the second slotted holes.

12. The easy-to-fold stroller according to claim 1, further comprising:

two front support assemblies, each front support assembly comprising an upper end hinged to the locking housing of a corresponding one of the locking assemblies and a lower end hinged to the front bottom rod of the corresponding side frame assembly and/or the front frame assembly; and two rear support assemblies, each rear support assembly comprising an upper end hinged to the locking housing of the corresponding locking assembly and a lower end hinged to the rear bottom rod of the corresponding side frame assembly and/or the rear frame assembly.

13. The easy-to-fold stroller according to claim 12, wherein, the front frame assembly is provided with two front sliding blocks and each front sliding block is slidable on the front frame assembly, the rear frame assembly is provided with two rear sliding blocks and each rear sliding block is slidable on the rear frame assembly, each front support assembly comprises:

a first front support rod comprising an upper end hinged to the locking housing of the corresponding locking assembly and a lower end hinged to a middle part of a second front support rod; and the second front support rod comprising an upper end hinged to a corresponding one of the front sliding blocks and a lower end hinged to the front bottom rod of the corresponding side frame assembly, the rear support assembly comprises:

a first rear support rod comprising an upper end hinged to the locking housing of the corresponding locking assembly and a lower end hinged to a middle part of a second rear support rod; and the second rear support rod comprising an upper end hinged to a corresponding one of the rear sliding blocks and a lower end hinged to the rear bottom rod of the corresponding side frame assembly.

14. The easy-to-fold stroller according to claim 13, wherein the front frame assembly is provided with two front limiting blocks, and the rear frame assembly is provided with two rear limiting blocks, when the easy-to-fold stroller is in the unfolded state, each front sliding block is abutted against a corresponding one of the front limiting blocks, and each rear sliding block is abutted against a corresponding one of the rear limiting blocks.

15. The easy-to-fold stroller according to claim 1, further comprising:

a plurality of swivel casters connected under the front frame assembly; and a plurality of fixed wheels connected under the rear frame assembly.

16. The easy-to-fold stroller according to claim 15, wherein the rear frame assembly is further provided with a driving pedal, a driving rod, and two wheel-locking assemblies, the driving pedal and the driving rod are configured to rotate around a central axis of the driving rod under an external force, resulting in the wheel-locking assemblies locking or releasing the plurality of fixed wheels.

17. The easy-to-fold stroller according to claim 16, wherein the fixed wheels are provided with a number of locking holes, and each wheel-locking assembly comprises:

a connecting housing with a rod-locking slot provided inside;

a telescopic rod mounted in the rod-locking slot and slidable between a locked position to be engaged in a corresponding one of the locking holes and a released position to be disengaged from the corresponding locking hole; and a return spring configured to impart a tendency to the telescopic rod to slide toward the released position.

18. The easy-to-fold stroller according to claim 17, wherein each end of the driving rod is provided with a driving inclined surface abutting against a first end of a corresponding one of the telescopic rods and configured to drive the corresponding telescopic rod to engage in the corresponding locking hole when the driving rod rotates toward a first direction, and the return spring is configured to drive the corresponding telescopic rod to disengage from the corresponding locking hole when the driving rod rotates toward a second direction.

19. The easy-to-fold stroller according to claim 1, wherein the rear end of each front bottom rod is provided with a first pivot member, and the front end of each rear bottom rod is provided with a second pivot member, one of the first pivot member and the second pivot member is provided with a limiting post, and the other of the first pivot member and the second pivot member is provided with a semi-circular limiting slot for receiving the limiting post, the limiting post is abutted against the end wall of the semi-circular limiting slot when the easy-to-fold stroller is in the unfolded state.

20. The easy-to-fold stroller according to claim 19, wherein one of the first pivot member and the second pivot member is provided with two limiting posts, and the other of the first pivot member and the second pivot member is provided with two semi-circular limiting slots for receiving the limiting posts in a one-to-one manner, and distances between the limiting posts and a pivot are different.

* * * * *